(12) United States Patent
Borden

(10) Patent No.: US 10,638,865 B2
(45) Date of Patent: May 5, 2020

(54) CARPET STRETCHING ASSEMBLY

(71) Applicant: Brant Borden, Fishers, IN (US)

(72) Inventor: Brant Borden, Fishers, IN (US)

( * ) Notice: Subject to any disclaimer, the term of this patent is extended or adjusted under 35 U.S.C. 154(b) by 17 days.

(21) Appl. No.: 16/012,443

(22) Filed: Jun. 19, 2018

(65) Prior Publication Data

US 2019/0380523 A1 Dec. 19, 2019

(51) Int. Cl.
*A47G 27/04* (2006.01)

(52) U.S. Cl.
CPC ...... *A47G 27/0493* (2013.01); *B32B 2471/02* (2013.01)

(58) Field of Classification Search
CPC ............... A47G 27/0493; B32B 2471/02
See application file for complete search history.

(56) References Cited

U.S. PATENT DOCUMENTS

| | | | | |
|---|---|---|---|---|
| 3,572,800 A * | 3/1971 | Graziano | ........... | A47G 27/0493 294/8.6 |
| 3,866,964 A * | 2/1975 | Prater | ................ | A47G 27/0493 294/8.6 |
| 3,917,225 A * | 11/1975 | Payson | ............... | A47G 27/0493 254/210 |
| 3,977,651 A * | 8/1976 | Chamberlain | ..... | A47G 27/0493 254/201 |
| 4,361,311 A * | 11/1982 | Koroyasu | .......... | A47G 27/0493 173/117 |
| 4,627,653 A * | 12/1986 | Koroyasu | .......... | A47G 27/0493 254/200 |
| 5,228,660 A * | 7/1993 | Massicotte | ......... | A47G 27/0493 254/201 |
| 5,288,057 A * | 2/1994 | Listau | ................ | A47G 27/0493 254/212 |
| D355,821 S | 2/1995 | Kruskamp | | |
| 6,698,721 B2 * | 3/2004 | Martin | ............... | A47G 27/0493 254/200 |
| 6,994,323 B2 | 2/2006 | Carbajal | | |
| 7,140,597 B2 * | 11/2006 | Chien | ................ | A47G 27/0493 254/201 |
| 7,758,022 B1 * | 7/2010 | Wright | ............... | A47G 27/0493 254/201 |
| 2006/0022181 A1 * | 2/2006 | Hochmeyer | ....... | A47G 27/0493 254/201 |
| 2007/0205404 A1 * | 9/2007 | Mancini | ............. | A47G 27/0493 254/201 |
| 2009/0195004 A1 * | 8/2009 | Mei | ..................... | A47G 27/0493 294/8.6 |
| 2019/0029453 A1 * | 1/2019 | Zhang | ................ | A47G 27/0493 |

* cited by examiner

*Primary Examiner* — Michael E Gallion

(57) ABSTRACT

A carpet stretching assembly includes a carpet stretcher that has a strike plate, a gripper and a tube extending therebetween. The carpet stretcher is positionable on a floor having the gripper engaging carpet on the floor and having the strike plate horizontally oriented for striking with a knee. The tube has a first portion that is slidably coupled to a second portion such that the tube has an adjustable length. A tube shock absorber is positioned within the tube and the tube shock absorber biases the strike plate away from the gripper. The tube shock absorber absorbs impact energy from the striker shock absorbers. Moreover, the tube shock absorber transfers the impact energy from the striker shock absorbers into the gripper. In this way the tube shock absorber enhances stretching the carpet when the strike plate is struck.

6 Claims, 5 Drawing Sheets

CARPET STRETCHING ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to stretching devices and more particularly pertains to a new stretching device for stretching carpet during installation of the carpet.

BRIEF SUMMARY OF THE INVENTION

An embodiment of the disclosure meets the needs presented above by generally comprising a carpet stretcher that has a strike plate, a gripper and a tube extending therebetween. The carpet stretcher is positionable on a floor having the gripper engaging carpet on the floor and having the strike plate horizontally oriented for striking with a knee. The tube has a first portion that is slidably coupled to a second portion such that the tube has an adjustable length. A tube shock absorber is positioned within the tube and the tube shock absorber biases the strike plate away from the gripper. The tube shock absorber absorbs impact energy from the striker shock absorbers. Moreover, the tube shock absorber transfers the impact energy from the striker shock absorbers into the gripper. In this way the tube shock absorber enhances stretching the carpet when the strike plate is struck.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
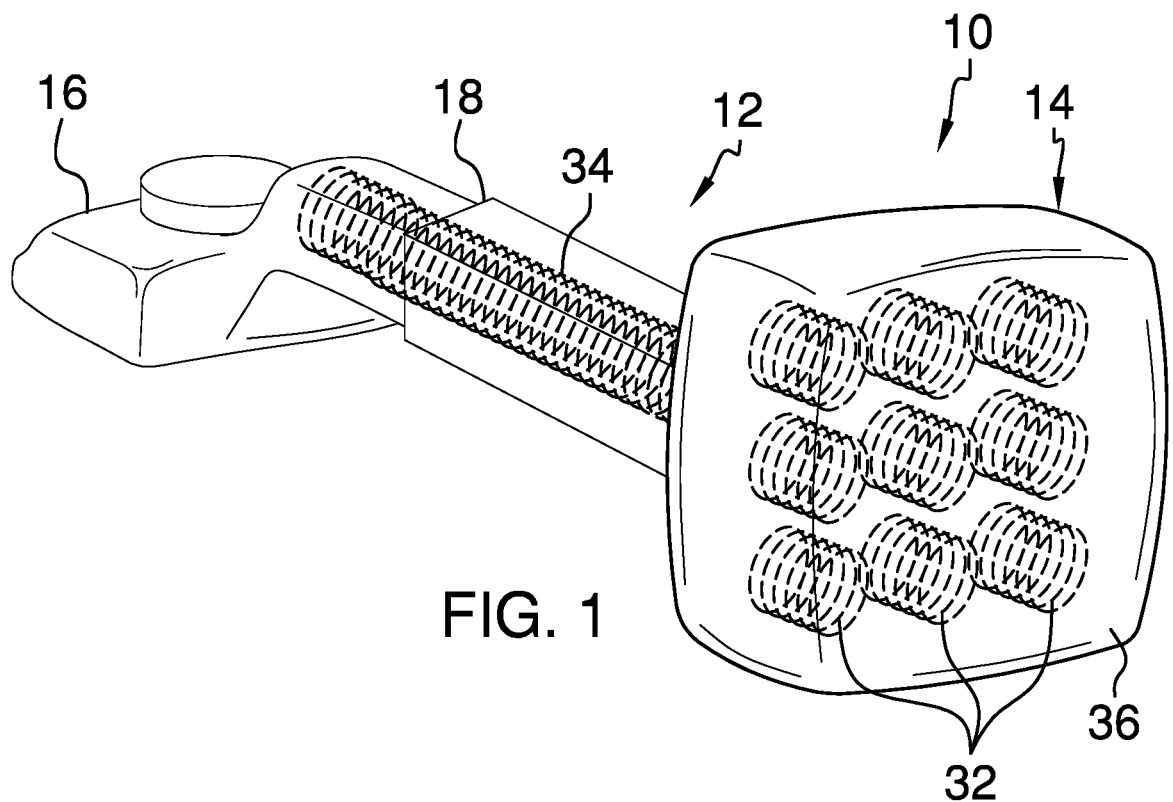
FIG. 1 is a phantom perspective view of a carpet stretching assembly according to an embodiment of the disclosure.
Figure 2:
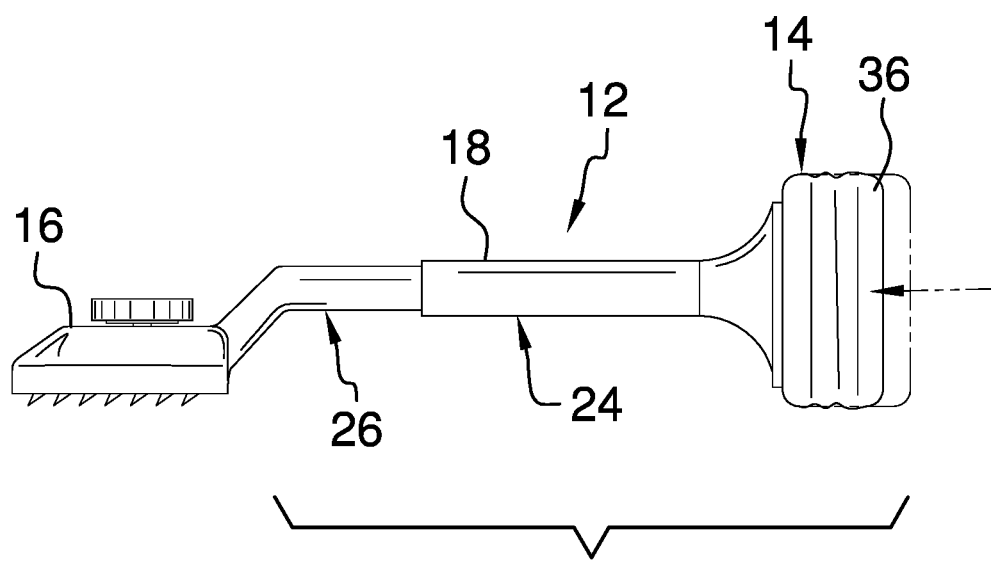
FIG. 2 is a right side view of an embodiment of the disclosure.
Figure 3:
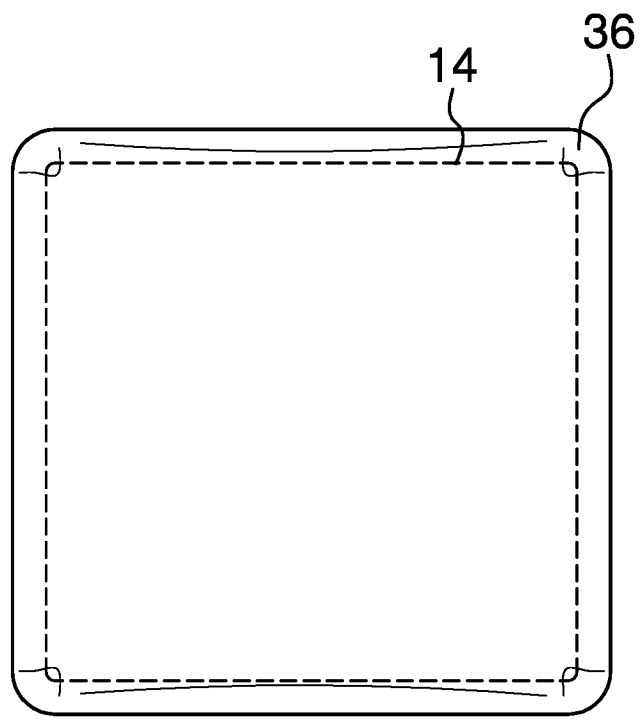
FIG. 3 is a front phantom view of an embodiment of the disclosure.
Figure 4:
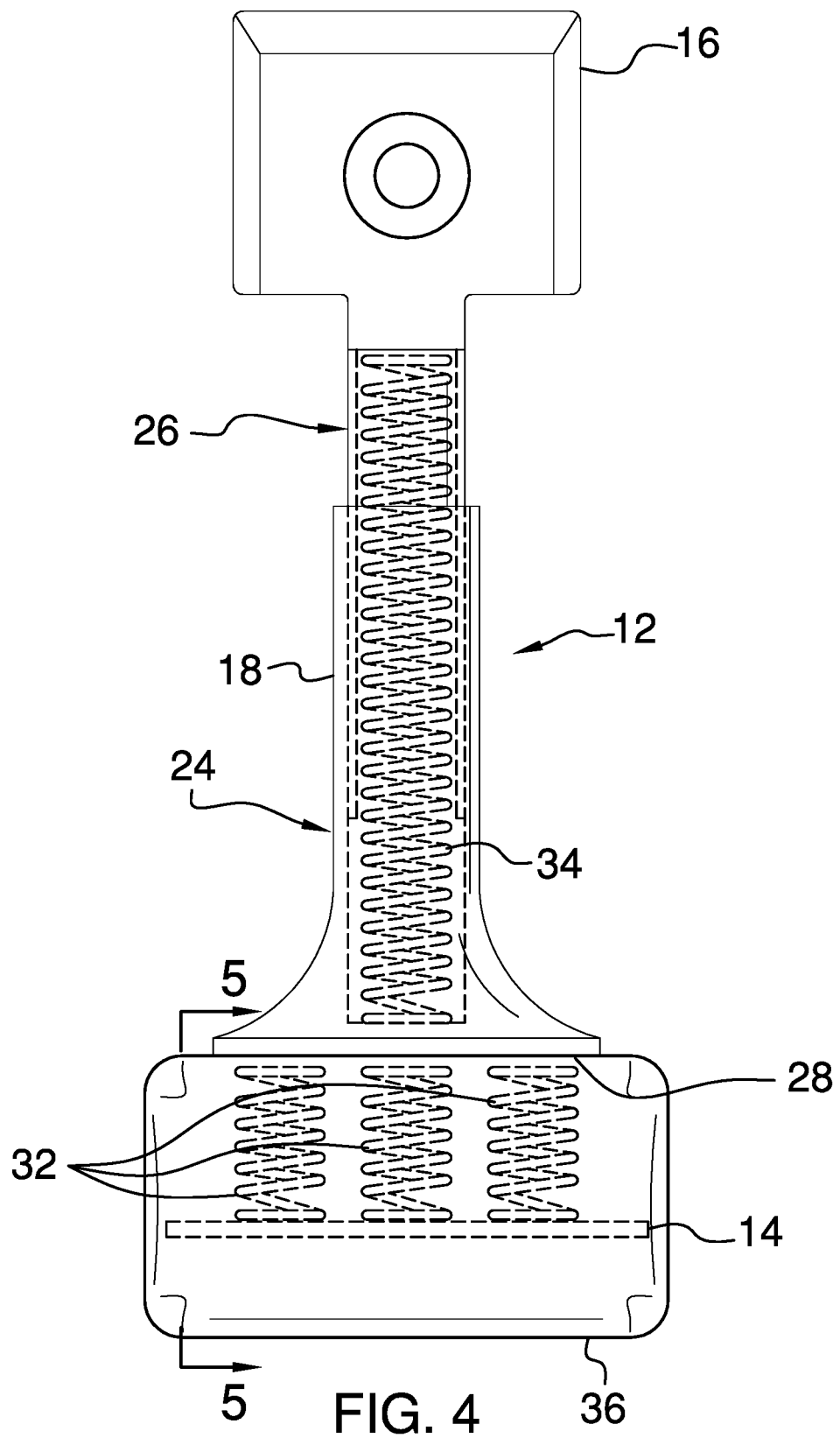
FIG. 4 is a top phantom view of an embodiment of the disclosure.
Figure 5:
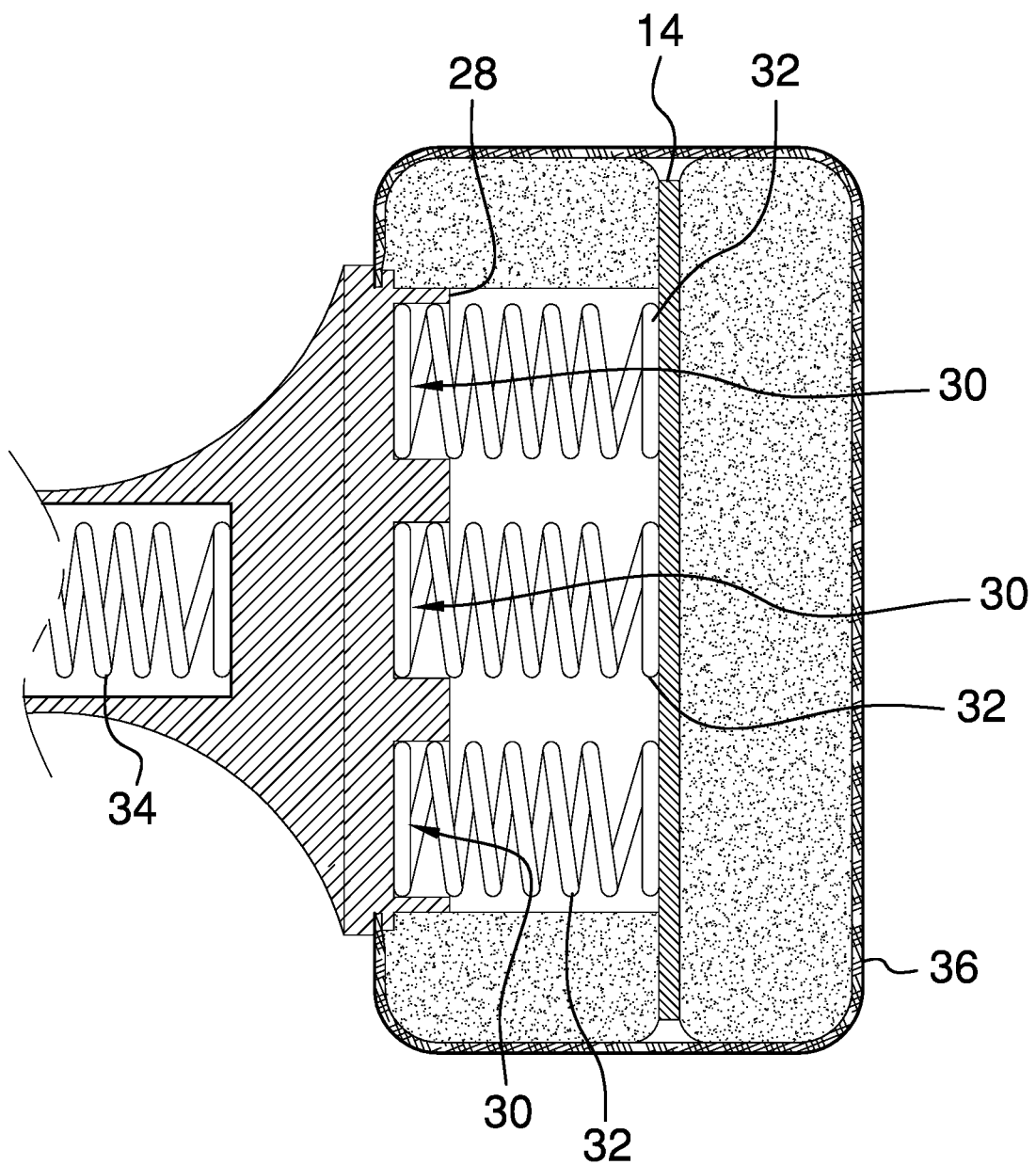
FIG. 5 is a cross sectional view taken along line 5-5 of FIG. 4 of an embodiment of the disclosure.
Figure 6:
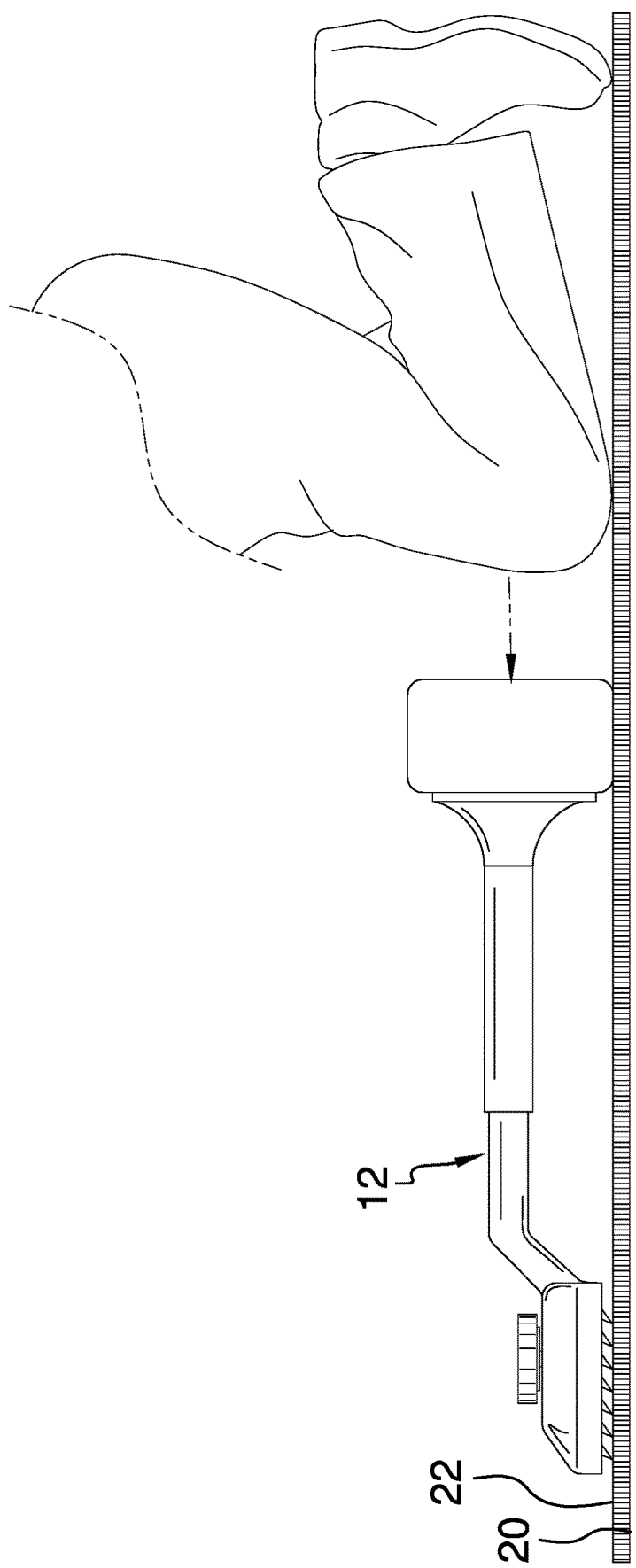
FIG. 6 is a perspective in-use view of an embodiment of the disclosure.

With reference now to the drawings, and in particular to FIGS. 1 through 6 thereof, a new stretching device embodying the principles and concepts of an embodiment of the disclosure and generally designated by the reference numeral 10 will be described.

As best illustrated in FIGS. 1 through 6, the carpet stretching assembly 10 generally comprises a carpet stretcher 12 that has a strike plate 14, a gripper 16 and a tube 18 extending therebetween. The carpet stretcher 12 is positionable on a floor 20 having the gripper 16 engaging carpet 22 on the floor 20 and having the strike plate 14 being horizontally oriented for striking with a knee. The tube 18 has a first portion 24 that is slidably coupled to a second portion 26 such that the tube 18 has an adjustable length. The strike plate 14 is positioned on the first portion 24, the gripper 16 is positioned on the second portion 26 and the strike plate 14 is slidable toward the gripper 16. The first portion 24 has a first end 28 that flares outwardly, the first end 28 is closed and the first end 28 has a plurality of wells 30 extending inwardly therein.

A plurality of striker shock absorbers 32 is provided and each of the striker shock absorbers 32 is positioned between the strike plate 14 and the tube 18. Each of the striker shock absorbers 32 absorbs impact energy when the strike plate 14 is struck with the knee reduce impact on the knee. Each of the striker shock absorbers 32 is positioned in a respective one of the wells 30 in the first end 28 of the first portion 24 of the tube 18 and engages the strike plate 14. Additionally, each of the striker shock absorbers 32 may comprise a spring, a hydraulic piston and any other type of compressible shock absorber.

A tube shock absorber 34 is positioned within the tube 18 and the tube shock absorber 34 biases the strike plate 14 away from the gripper 16. The tube shock absorber 34 absorbs impact energy from the striker shock absorbers 32. Moreover, the tube shock absorber 34 transfers the impact energy from the striker shock absorbers 32 into the gripper 16. In this way the tube shock absorber 34 enhances stretching the carpet 22 when the strike plate 14 is struck. The tube shock absorber 34 may comprise a spring, a hydraulic piston and any other type of compressible shock absorber. A pad 36 is positioned around the strike plate 14 and the pad 36 is comprised of a resiliently compressible material for enhancing comfort on the knee when the strike plate 14 is struck.

In use, the gripper 16 is positioned to engage the carpet 22 on the floor 20 and the pad 36 is struck with the knee. Thus, the strike plate 14 compresses each of the striker shock absorbers 32 thereby facilitating each of the striker shock absorbers 32 to absorb the impact energy of the knee. The striker shock absorbers 32 subsequently expand, and the tube shock absorber 34 absorbs the energy transferred through each of the striker shock absorbers 32. Thus, the striker shock absorber 32 subsequently expands, thereby urging the gripper 16 away from the strike plate 14 for stretching the carpet 22. In this way comfort of the knee is enhanced without sacrificing energy for stretching the carpet 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A carpet stretching assembly having spring assistance for stretching carpet, said assembly comprising:
    a carpet stretcher having a strike plate, a gripper and a tube extending therebetween, said carpet stretcher being positionable on a floor having said gripper engaging carpet on the floor and having said strike plate being vertically oriented wherein said strike plate is configured for being struck by a knee, said tube having a first portion being slidably coupled to a second portion such that said tube has an adjustable length;
    a striker shock absorber being positioned between said strike plate and said tube; and
    a tube shock absorber being positioned within said tube, said tube shock absorber biasing said strike plate away from said gripper, said tube shock absorber absorbing impact energy from said striker shock absorber, said tube shock absorber transferring the impact energy from said striker shock absorber into said gripper wherein said tube shock absorber is configured to enhance stretching the carpet when said strike plate is struck.

2. The assembly according to claim 1, wherein said strike plate is positioned on said first portion, said gripper being positioned on said second portion, said strike plate being slidable toward said gripper, said first portion having a first end flaring outwardly, said first end being closed, said first end having a plurality of wells extending inwardly therein.

3. The assembly according to claim 2, further comprising said striker shock absorber being one of a plurality of striker shock absorbers, each of said striker shock absorbers being positioned between said strike plate and said tube, each of said striker shock absorbers absorbing impact energy when said strike plate is struck with the knee wherein each of said striker shock absorbers is configured to reduce impact on the knee.

4. The assembly according to claim 3, wherein each of said striker shock absorbers is positioned in a respective one of said wells in said first end of said first portion of said tube and engages said strike pad.

5. The assembly according to claim 1, further comprising a pad being positioned around said strike plate, said pad being comprised of a resiliently compressible material wherein said pad is configured for enhancing comfort on the knee when said strike plate is struck.

6. A carpet stretching assembly having spring assistance for stretching carpet, said assembly comprising:
    a carpet stretcher having a strike plate, a gripper and a tube extending therebetween, said carpet stretcher being positionable on a floor having said gripper engaging carpet on the floor and having said strike plate being vertically oriented wherein said strike plate is configured for being struck by a knee, said tube having a first portion being slidably coupled to a second portion such that said tube has an adjustable length, said strike plate being positioned on said first portion, said gripper being positioned on said second portion, said strike plate being slidable toward said gripper, said first portion having a first end flaring outwardly, said first end being closed, said first end having a plurality of wells extending inwardly therein;
    a plurality of striker shock absorbers, each of said striker shock absorbers being positioned between said strike plate and said tube, each of said striker shock absorbers absorbing impact energy when said strike plate is struck with the knee wherein each of said striker shock absorbers is configured to reduce impact on the knee, each of said striker shock absorbers being positioned in a respective one of said wells in said first end of said first portion of said tube and engaging said strike plate;
    a tube shock absorber being positioned within said tube, said tube shock absorber biasing said strike plate away from said gripper, said tube shock absorber absorbing impact energy from said striker shock absorbers, said tube shock absorber transferring the impact energy from said striker shock absorbers into said gripper wherein said tube shock absorber is configured to enhance stretching the carpet when said strike plate is struck; and
    a pad being positioned around said strike plate, said pad being comprised of a resiliently compressible material for enhancing comfort on the knee when said strike plate is struck.

\* \* \* \* \*